(12) United States Patent
Ferreira Da Silva et al.

(10) Patent No.: US 12,577,118 B2
(45) Date of Patent: Mar. 17, 2026

(54) DHSV SCALE REMOVAL METHOD IN THE PRODUCTION STRING

(71) Applicant: Petróleo Brasileiro S.A.—Petrobras, Rio de Janeiro (BR)

(72) Inventors: Mario Germino Ferreira Da Silva, Rio de Janeiro (BR); Giselle Maria Lopes Leite Da Silva, Aracaju (BR); Tiago Cavalcante Freitas, Rio de Janeiro (BR); Rosane Alves Fontes, Petrópolis (BR); Fernando Antonio Moreira Da Silva, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 805 days.

(21) Appl. No.: 17/890,340

(22) Filed: Aug. 18, 2022

(65) Prior Publication Data

US 2023/0054645 A1 Feb. 23, 2023

(30) Foreign Application Priority Data

Aug. 18, 2021 (BR) ...................... 10 2021 016391 7

(51) Int. Cl.
| | |
|---|---|
| *C01D 1/22* | (2006.01) |
| *C01F 11/18* | (2006.01) |
| *C01C 1/26* | (2006.01) |

(52) U.S. Cl.
CPC ............... *C01D 1/22* (2013.01); *C01F 11/18* (2013.01); *C01C 1/26* (2013.01)

(58) Field of Classification Search
CPC .......... E21B 37/00; E21B 37/06; E21B 37/10; E21B 21/00
See application file for complete search history.

(56) References Cited

U.S. PATENT DOCUMENTS

| | | | | |
|---|---|---|---|---|
| 5,671,810 | A * | 9/1997 | Hodge | E21B 31/03 |
| | | | | 507/260 |
| 10,526,869 | B2 | 1/2020 | Mebratu et al. | |
| 2014/0262283 | A1* | 9/2014 | Savari | E21B 36/001 |
| | | | | 166/305.1 |
| 2018/0298721 | A1* | 10/2018 | Mebratu | E21B 37/06 |

FOREIGN PATENT DOCUMENTS

| | | |
|---|---|---|
| BR | PI0519239 A2 | 1/2009 |
| CN | 108643858 A | 10/2018 |
| WO | 2006069247 A2 | 6/2006 |

* cited by examiner

*Primary Examiner* — Yanick A Akaragwe
(74) *Attorney, Agent, or Firm* — Morrison & Foerster LLP

(57) ABSTRACT

The present invention addresses to a method of removing scale from the DHSV of the oil production string aiming at maintaining the production of the wells and thus avoiding the loss of production. First, a neutralizing solution is placed in the service line, before pumping the scale removing solution through the string to act on the DHSV. Next, the acid is pumped into the production string to react with the calcium carbonate scale. After the time for the dissolution of the scale inside the DHSV, the well is opened for production by the service line. The spent acid is mixed with the neutralizing solution inside the service line, reducing its corrosiveness in relation to the service line, contributing to its preservation.

4 Claims, 2 Drawing Sheets

DHSV SCALE REMOVAL METHOD IN THE PRODUCTION STRING

Cross-Reference to Related Application

This application claims priority to Brazilian Application No. 10 2021 016391 7 filed on Aug. 18, 2021, and entitled "DHSV SCALE REMOVAL METHOD IN THE PRODUCTION STRING," the disclosure of which is incorporated herein by reference in its entirety.

FIELD OF THE INVENTION

The present invention addresses to a method of removing DHSV (DOWNHOLE SAFETY VALVE) scale in the production string, with application in the field of oil wells, aiming at maintaining the production of the wells and thus avoiding the loss of production.

DESCRIPTION OF THE STATE OF THE ART

A DHSV (DOWNHOLE SAFETY VALVE) valve refers to an oil and gas well component, which acts as a fail-safe valve, preventing the uncontrolled release of fluids from the reservoir, in the event of a surface disaster in the worst scenario. It is almost always installed below the seabed, normally around 500 m below the seabed, as illustrated in FIG. 1, being a vital safety component in the completion of oil wells. Every DHSV model has a flapper valve at the base, which is the part of the DHSV, that, when activated, promotes the sealing of the production string.

When scale formation occurs in the DHSV of the production string of pre-salt oil wells, it is necessary to remove this scale, in order to maintain the production of the wells.

As far as the scale builds up in the production string, specifically in the DHSV valve, the formation of a scale deposit circumscribed to the DHSV occurs. Normally, the valves installed in the production string of oil wells have a diameter slightly smaller than the internal diameter of the string. This diameter reduction facilitates the creation of a zone conducive to the deposit of scale and, as a result of this change in diameter, the deposit adheres in a circumscribed way to the DHSV. As the scale increases in thickness inside the string, inside the DHSV, the diameter available for the oil passage is reduced, generating a head loss in the string, at the height of the DHSV, which, gradually, reduces the production flow rate from the well. The fouling increases from the inner ring of the DHSV valve to the interior of the production string, which can result in the blocking of the inner diameter of the DHSV, as shown in the sequence of FIGS. 2A, 2B, 2C, and 2D.

Currently, the process of removing scale from the inside of the production string, including in the DHSV, is carried out by pumping and displacing the treatment fluids into the production string of the well. The treatment fluid is placed at the depth where the scale is. Next, it is necessary to wait a while for the end of the scale removal reaction. Next, the volume of acid used to remove the scale is injected into the reservoir in order to neutralize the same. After the average time for the neutralization of the treatment fluids, the well is opened for the production and cleaning of these fluids.

The occurrence of calcium carbonate scale is the most common in pre-salt fields. For the removal of this type of scale ($CaCO_3$), when it occurs in the production string, the use of mineral acids, such as HCl, or organic acids, such as formic acid and acetic acid, is normally indicated. Corrosion inhibitors are added to these acids, before being pumped, in order to protect the production system, such as the production risers, the production lines, the wet Christmas tree (WCT), the production string and their components.

However, after removing the fouling from the inside of the string, with the use of acids, it is necessary to perform its neutralization. This neutralization is done by means of the injection of the volume of acid in the reservoir, whose objective is to carry out the reaction of the acid with the calcium carbonate of the reservoir. The products of this reaction are calcium chloride, carbon dioxide and water, which result in the raise the pH of the solution, thus reducing the corrosiveness that the acid would cause in the equipment of the production system.

In this way, the need arises to remove scale in the DHSV valve in production strings of pre-salt oil wells, without interruption of production.

Document U.S. Ser. No. 10/526,869 discloses a process of reducing or removing scale around a DSV (Downhole Safety Valve) and specifically in the portion of the well above the DSV. The well fluid is displaced using a gas, the DSV is closed, the gas is released and a treatment fluid comprising a base fluid and a scale removing agent is injected into the well volume above the DSV.

Document PI0519239 refers to apparatus and methods for installing a subsurface safety valve, incorporating a bypass duct in order to allow communication between a surface station and a lower zone, independent of the operation of the safety valve. Furthermore, it discloses a method for injecting the fluid from a surface location, through the subsurface safety valve, to a location below the subsurface safety valve in the well.

Document CN108643858 discloses a cleaning system for a liquid inlet of the downhole safety valve piston, a method of checking for closing abnormalities and a cleaning method. A chemical cleaning liquid is added to the piston liquid inlet by means of a cleaning line or hydraulic control line, and the chemical cleaning liquid is pumped repeatedly to clean impurities in the piston liquid inlet.

In this way, none of the documents of the state of the art disclose a DHSV scale removal method such as that of the present invention.

Thus, in order to solve the problem of production losses associated with the formation of scale in the DHSV for producing wells, the present invention describes a method of pumping a neutralizing solution in the service line, before pumping the acidic solution inside the production string to react with the calcium carbonate and thus dissolve the scale inside the DHSV. Afterwards, the well is opened for production by the service line and the spent acid is neutralized inside the service line, thus reducing its corrosiveness and helping to preserve the service line.

The present invention provides better production management and, therefore, better reservoir management, as it reduces the time required for cleaning the well, promotes an increase in the useful life of the service line, and can be applied to the maintenance of production in fields where there are problems of calcium carbonate scale, such as in pre-salt fields, obtaining economy in the maintenance of production.

In this way, this invention presents technical advantages by adapting the technology to the application scenario, as well as economic advantages due to the cost reduction associated with the reduction of operational time for cleaning the wells.

BRIEF DESCRIPTION OF THE INVENTION

The present invention addresses to a method of removing DHSV scale in the production string, maintaining the production of the wells and avoiding the loss of production. First, the neutralizing solution is placed in the service line, before the scale removing solution is pumped through the string. Next, the acid is pumped into the production string to react with the calcium carbonate scale. After the time for the dissolution of the scale inside the DHSV, the well is opened for production by the service line and, then, the spent acid is mixed with the neutralizing solution inside the service line, thus reducing the corrosive attack to the piping and helping to preserve the same.

The present invention can be used in the remote intervention of wells in the productivity restoration phase, by means of acid injection operations, without the need for injection into the reservoir. In this way, the application of the technology creates easiness for the management of fouling for producing wells and in the recovery of the productivity index.

BRIEF DESCRIPTION OF DRAWINGS

The present invention will be described in more detail below, with reference to the attached figures which, in a schematic way and not limiting the inventive scope, represent examples of its embodiment. In the drawings, there are.

DETAILED DESCRIPTION OF THE INVENTION

Figure 1:
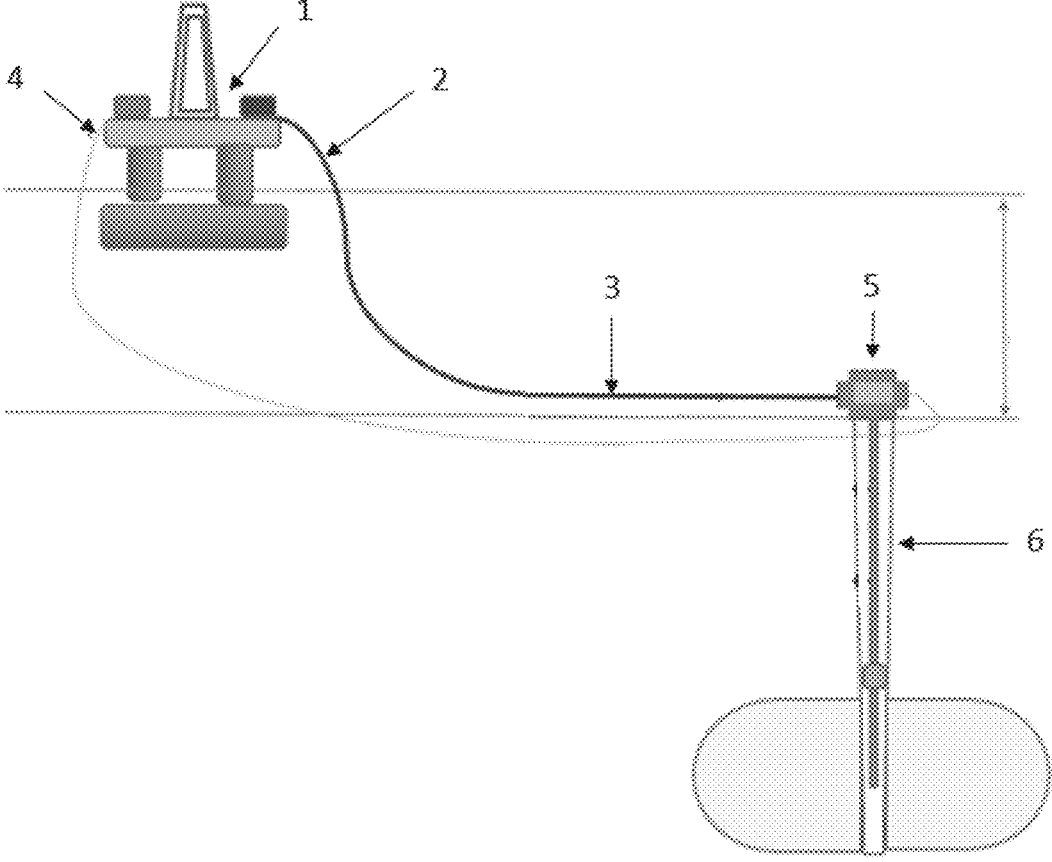
FIG. 1 illustrating a layout of the Stationary Production Unit (SPU) (1) connected to the well through the production riser (2) in the vertical section that continues as a production line (3) in the horizontal section to connect to the wet Christmas tree (WCT) (5) from the oil well (6) through a production line (3), a gas line (4) connected from the SPU to the WCT (5) of the well. The production of the well passes from the WCT (5) through the horizontal section corresponding to the production line (3) on the seabed, which goes until the beginning of the vertical section of the line corresponding to the production riser (2) that goes from the seabed to the SPU (1)
Figures 2A, 2B, 2C, 2D:
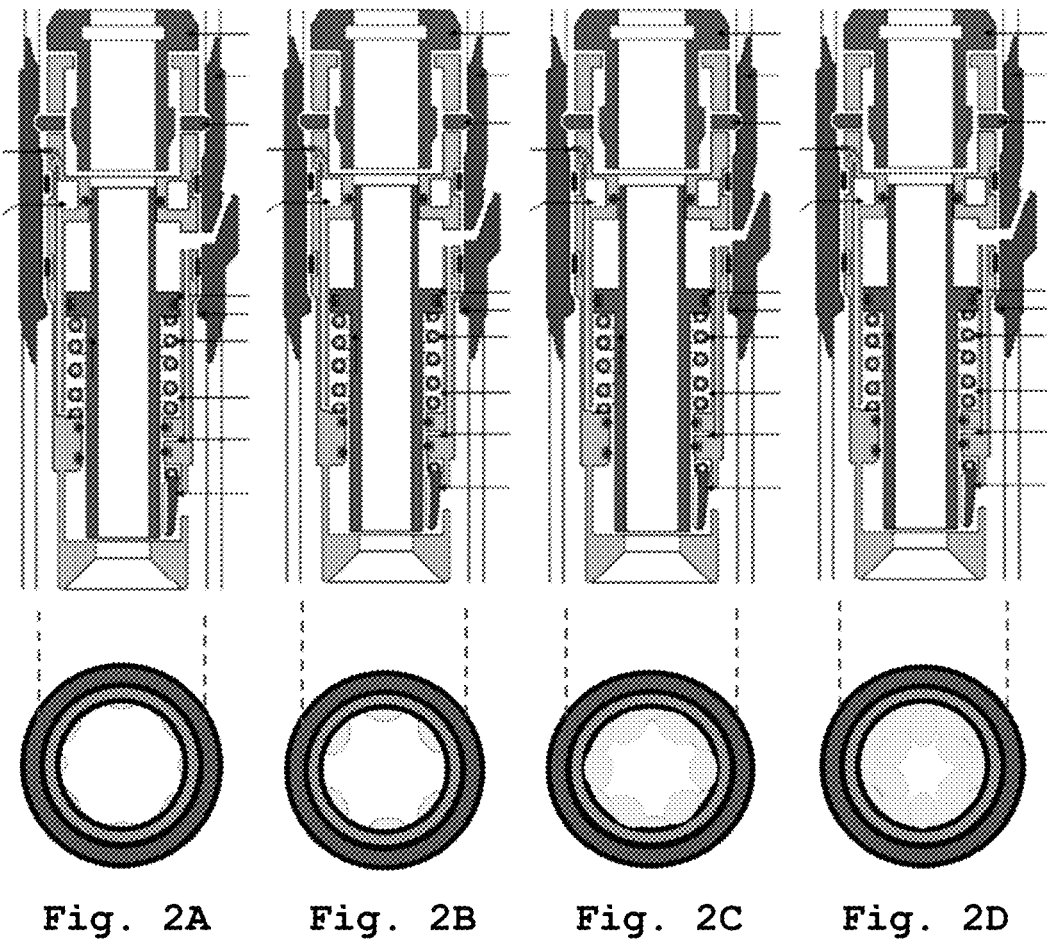
FIGS. 2A-2D illustrating in the upper part the side views and in the lower part the top views of the DHSV, where the fouling grows by increasing the inner ring of the DHSV valve towards the interior of the string until promoting the blocking of the inner diameter of DHSV.

The scale removal method, according to the present invention, comprises an operational sequence, by which scale removal is carried out in the DHSV, avoiding the loss of production associated with the formation of scale inside the string, without injecting removing solutions in the reservoir, helping to prevent damage to the reservoir. The purpose of this method is to place a neutralizing solution in the service line, where it will remain isolated until the end of the DHSV scale removal operation. When the well is opened for cleaning, then this solution will be used for the neutralization of the acid, by means of the synchronism of the pumping of the same by the service line with the well production.

In a second aspect, to avoid acid corrosivity in the service or gas lift line, a solution is used to neutralize excess acid that has not reacted with the calcium carbonate scale inside the string in the DHSV. In the operational sequence, before pumping the acid into the production string to act on the DHSV, the neutralizing solution is placed inside the service or gas lift line and remains inside the line until the reaction time of the acid with the scale is ended. Then, the well is opened to produce through the service line to the SPU (Stationary Production Unit). This way, the acid is neutralized when mixed with the solution, reducing the possibility of damage to the service line.

The step by step of the pumping sequence of the treatment, and the opening and closing of the valves of the wet Christmas tree (WCT), is used to plan the steps of the pumping operation and the volumetries that will be used. Information such as system volumetry, production and gas lift lines and production string, production string layout, static pressure values, flow pressure, oil viscosity, API grade, types of organic or mineral acids, neutralizing solution and fluids of displacement are used for planning the pumping operation, as well as the balancing of the fluids in order to allow the removing solution to be placed inside the string at the depth corresponding to the DHSV to guarantee the efficiency of scale removal.

The acid pumping sequence to remove DHSV fouling, in direct remote treatment from the SPU or through a stimulation boat passing through the SPU, using prior pumping of an alkalizer agent to neutralize the acid instead of injecting the same into the reservoir, according to the present invention, comprises the following steps:

(1) Opening the WCT valve that gives access from the production line to the interior of the production string;

(2) Pumping a $1^{st}$ diesel spacer cushion;

(3) Pumping an alkalizer cushion, containing caustic soda and/or sodium bicarbonate in the same concentration as the acid, in a volume 1.5 times the volume of acid that will be pumped, wherein the acid can be chosen from organic acids such as 7% formic acid or 10% acetic acid, and mineral acids such as 15% hydrochloric acid;

(4) Pumping a $2^{nd}$ diesel spacer cushion with a volume equal to that of the $1^{st}$ diesel cushion;

(5) Pumping the DBX (diesel, butyl glycol and xylene) cushion;

(6) Pumping with completion fluid to displace the front of the $1^{st}$ diesel spacer cushion to the WCT, then stop pumping;

(7) Closing the WCT valve that gives access to the string;

(8) Opening the WCT valve that gives access to the lift gas line;

(9) Pumping, placing the $1^{st}$ diesel spacer cushion and the entire alkalizer cushion and the $2^{nd}$ diesel cushion to the interior of the gas lift line, in order to leave the interior of the WCT with diesel;

(10) Closing the WCT valve that gives access to the lift gas line;

(11) Opening the WCT valve that gives access to the production string;

(12) Pumping a cushion of DBX (diesel, butyl glycol and xylene) and the acid to the interior of the production string up to the DHSV;

(13) Waiting for a contact time of about 30 minutes for 15% hydrochloric acid, and 1 hour for 10% acetic acid and/or 7% formic acid for the $CaCO_3$ removal reaction;

(14) Opening the WCT valve that gives access to the lift gas line;

(15) Opening the well for cleaning and, simultaneously, pumping, through the lift gas line, the (alkaline) neutralizing solution which can be caustic soda, sodium bicarbonate or ammonium carbonate in the same concentration of the acid that was used, 15% hydrochloric acid, 10% acetic acid and/or 7% formic acid, to promote the neutralization of the acid that will be produced by the well, mixed with the oil.

EXAMPLES

The result obtained by the invention, in a first aspect, can be measured by the recovery of the production flow rate of the wells, which always occurs in the chemical treatments carried out to eliminate calcium carbonate scales.

In a second aspect, it has the advantage of preserving the service and/or gas lift line. The objective is to carry out an operational sequence in which the service line or gas lift line is used to reserve a volume of neutralizing solution that will come into action, when the well is put into production, to neutralize the acidic solution through this line.

The present invention collaborates to maintain the production of producing fields, since it increases the MTBF of the service and/or gas lift lines due to the neutralization of the produced acid. The treatments using this technology have the advantage of injecting only the amount of solution needed to remove scale into the DHSV, reducing pumping time and well cleaning time and increasing the safety of the operation.

In addition, the possibility of using remote intervention, instead of operating with a rig, implies in cost reduction in scale management, in interventions for scale removal by injection of acidic removers.

It should be noted that, although the present invention has been described in relation to the attached drawings, it may undergo modifications and adaptations by technicians skilled on the subject, depending on the specific situation, but provided that it is within the inventive scope defined herein.

The invention claimed is:

1. A downhole safety valve (DHSV) scale removal method in a production string, the method comprising:

opening a first wet Christmas tree (WCT) valve that gives access from a production line to an interior of the production string;

pumping a $1^{st}$ diesel spacer cushion;

pumping an alkalizer cushion in a volume 1.5 times a volume of acid to be pumped;

pumping a $2^{nd}$ diesel spacer cushion with a volume equal to that of the $1^{st}$ diesel spacer cushion;

pumping a diesel, butyl glycol, and xylene (DBX) cushion;

pumping completion fluid to displace a front of the $1^{st}$ diesel spacer cushion to the first WCT valve, then stopping pumping;

closing the first WCT valve that gives access to the production string;

opening a second WCT valve that gives access to a lift gas line;

pumping the $1^{st}$ diesel spacer cushion, the alkalizer cushion, and the $2^{nd}$ diesel spacer cushion to an interior of the lift gas line;

closing the second WCT valve that gives access to the lift gas line;

opening the first WCT valve that gives access to the production string;

pumping a cushion of DBX and the acid to the interior of the production string up to the DHSV;

waiting for a contact time between 30 minutes and 1 hour for CaCO3 removal reaction;

opening the second WCT valve that gives access to the lift gas line; and opening a well for cleaning and simultaneously pumping, through the lift gas line, a neutralizing solution to neutralize the acid produced by the well, mixed with oil.

2. The method of claim 1, wherein the alkalizer cushion comprises caustic soda and/or sodium bicarbonate.

3. The method of claim 1, wherein the acid comprises organic or mineral acids, wherein the organic or mineral acids comprise 7% formic acid, 10% acetic acid, and/or 15% hydrochloric acid.

4. The method of claim 1, wherein the neutralizing solution comprises caustic soda, sodium bicarbonate, or ammonium carbonate.

* * * * *